(12) United States Patent
Göltenboth

(10) Patent No.: US 9,161,657 B2
(45) Date of Patent: Oct. 20, 2015

(54) COFFEE MACHINE

(75) Inventor: Frank Göltenboth, Blaustein (DE)

(73) Assignee: WMF WÜRTTEMBERGISCHE METALL WARENFABRIK AG, Geislingen (DE)

( * ) Notice: Subject to any disclaimer, the term of this patent is extended or adjusted under 35 U.S.C. 154(b) by 1694 days.

(21) Appl. No.: 11/997,097

(22) PCT Filed: Jul. 21, 2006

(86) PCT No.: PCT/EP2006/007206
§ 371 (c)(1),
(2), (4) Date: Jul. 17, 2008

(87) PCT Pub. No.: WO2007/014654
PCT Pub. Date: Feb. 8, 2007

(65) Prior Publication Data
US 2009/0011110 A1 Jan. 8, 2009

(30) Foreign Application Priority Data
Jul. 29, 2005 (EP) ..................... 05016580

(51) Int. Cl.
A23L 1/00 (2006.01)
B67D 1/00 (2006.01)
A47J 31/00 (2006.01)
A47J 31/44 (2006.01)
A23G 9/04 (2006.01)

(52) U.S. Cl.
CPC ............. *A47J 31/4485* (2013.01); *A23G 9/045* (2013.01); *A47J 31/005* (2013.01)

(58) Field of Classification Search
CPC ... A47J 31/0573; A47J 31/4485; A47J 31/46; A47J 31/401; A47J 31/005; A47G 19/14; A23G 9/045; B67D 1/07; B29B 13/022; A23F 5/40; A23F 5/12
USPC ............. 99/294, 288, 323.1, 290, 323.3, 275, 99/279, 293; 222/148, 146.2; 426/594, 426/595
See application file for complete search history.

(56) References Cited

U.S. PATENT DOCUMENTS

| 4,518,105 | A | | 5/1985 | Kuckens et al. | |
|---|---|---|---|---|---|
| 5,613,422 | A | * | 3/1997 | Giuliano | 99/281 |

(Continued)

FOREIGN PATENT DOCUMENTS

| DE | 445436 | | 6/1927 |
|---|---|---|---|
| EP | 904719 | A1 | 3/1999 |

(Continued)

OTHER PUBLICATIONS

Japanese Office Action for 2008-523199, dated Apr. 24, 2012.

(Continued)

*Primary Examiner* — Dana Ross
*Assistant Examiner* — Hemant Mathew
(74) *Attorney, Agent, or Firm* — Marshall, Gerstein & Borun LLP

(57) ABSTRACT

A coffee machine for preparing hot, milk-containing beverages and having a milk supply (15) and a discharge means (8). In order to achieve improved handling, the milk supply (15) is configured for accommodating concentrated milk, and a mixing device (17) is provided for mixing the concentrated milk with water.

8 Claims, 1 Drawing Sheet

(56) References Cited

U.S. PATENT DOCUMENTS

| | | | |
|---|---|---|---|
| 5,762,989 A * | 6/1998 | Savello | 426/583 |
| 6,183,800 B1 * | 2/2001 | van Straten et al. | 426/569 |
| 6,713,110 B2 * | 3/2004 | Imboden et al. | 426/511 |
| 6,726,950 B2 * | 4/2004 | Yuzawa | 426/569 |
| 6,977,091 B2 * | 12/2005 | Carhuff et al. | 426/590 |
| 7,021,206 B2 * | 4/2006 | Eckenhausen et al. | 99/452 |
| 2004/0025701 A1 * | 2/2004 | Colston et al. | 99/279 |
| 2004/0118291 A1 * | 6/2004 | Carhuff et al. | 99/275 |
| 2005/0118319 A1 * | 6/2005 | Green et al. | 426/564 |

FOREIGN PATENT DOCUMENTS

| | | |
|---|---|---|
| JP | 7200944 A | 8/1995 |
| JP | 8089165 | 4/1996 |
| JP | 2000106820 A | 4/2000 |
| JP | 2004528143 A | 9/2004 |
| JP | 2005066313 A | 3/2005 |
| WO | WO-02/100224 | 12/2002 |
| WO | WO 02100224 A2 * | 12/2002 |
| WO | WO-2004/028260 | 4/2004 |
| WO | WO-2007/014654 | 2/2007 |

OTHER PUBLICATIONS

Office Action for JP 2008-523199 mailed Oct. 25, 2011.
Notice of Opposition for European Application No. 05016580.2, dated Nov. 27, 2008.
Response to Notice of Opposition, dated Jul. 20, 2009.
Notice of Oral Proceedings, dated Mar. 16, 2010.
Opponent's further written submission in connection with Opposition, dated Aug. 26, 2010.
Decision to Reject Opposition, dated Oct. 12, 2010.
Opponent's Notice of Appeal regarding Decision to Reject Opposition, dated Dec. 13, 2010.
Opponent's Appeal Brief to Decision to Reject Opposition, dated Feb. 12, 2011.
Response to Appeal Brief, dated Jun. 22, 2011.

* cited by examiner

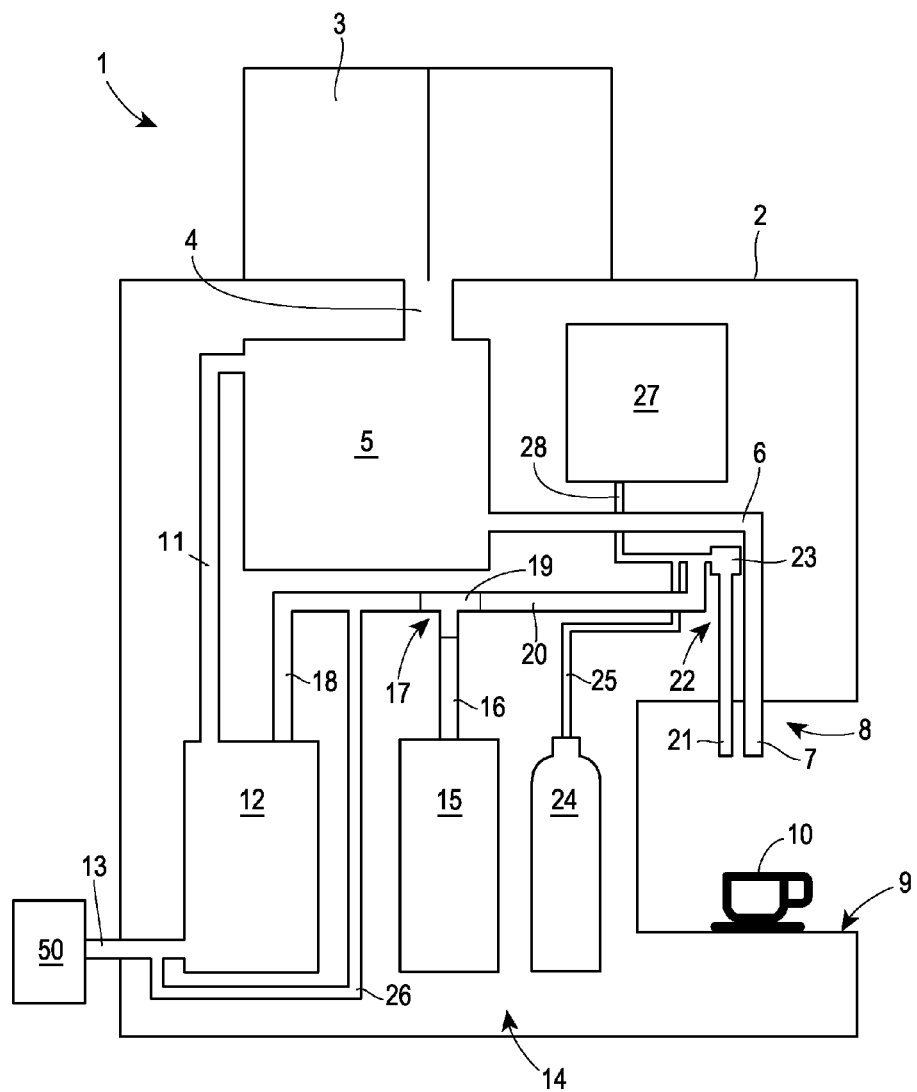

COFFEE MACHINE

CROSS-REFERENCE TO RELATED APPLICATION

The present application claims the benefit of priority of International Patent Application No. PCT/EP2006/007206 filed on Jul. 21, 2006, which application claims priority of EP Patent Application No. 05016580.2, filed Jul. 29, 2005. The entire text of the priority application is incorporated herein by reference in its entirety.

FIELD OF DISCLOSURE

The present disclosure relates to a coffee machine of the type specified in the preamble of claim 1.

BACKGROUND

Coffee machines dispensing not only brewed beverages but also milk are known in large numbers, e.g. from DE-A-44 45 436. The known coffee machine comprises a foaming unit with which liquid fresh milk taken e.g. from a separate milk container or from a retail pack, such as the known milk cartons, is heated and foamed with the aid of air and steam introduced in the milk. The milk foam is then used for preparing cappuccino. Fresh liquid milk is, however, perishable and necessitates a cold chain which, for hygienic reasons, should not be interrupted as far as possible. Since the percentage of milk-containing beverages, such as cappuccino, white coffee, latte macchiato, etc., increases constantly, the proportion by volume of milk of the hot beverages dispensed already amounts to more than 60% in many enterprises, such as restaurants, cafes or the like. The large amount of milk to be provided creates problems as regards logistics-transport, stockkeeping, cooling and provision of the milk for the coffee machine as well as additional handling through constant replacement of the milk carton and replenishment. Moreover, additional large-volume cooling facilities are required in the counter area.

However, the known coffee machine also offers the possibility of foaming cold milk or of simply heating the milk making use of the steam so that hot milk can be dispensed. The foaming of cold milk requires a high energy input within the shortest possible time, the heating speed being, however, restricted by physical limits. Providing these large amounts of energy in the form of steam is very costly and necessitates the use of a powerful steam generator or steam boiler, since, at least in some countries, the customers' preference tends towards an increasingly higher percentage of milk or milk foam in comparison with the volume of the rest of the beverage. This has the effect that the time required for preparing hot milk or hot milk foam becomes more and more dominant in comparison with the time required for preparing the beverage so that there will be a substantial increase in the time which is necessary for preparing the whole beverage, and this may cause problems, especially in periods of peak activity in restaurants or the like.

SUMMARY OF THE DISCLOSURE

It is therefore the object of the present disclosure to provide a coffee machine which can be handled more easily.

The use of concentrated milk offers the possibility of simplifying stockkeeping, reducing the length of the replacement cycles and drastically reducing the demands on the cooling volume to be provided.

In addition to the above-mentioned advantages, the heating of the concentrated milk by mixing this milk with hot water, which is prepared in a coffee machine in any case, offers the essential advantage that the time which elapses before a predetermined temperature is reached can be reduced essentially in comparison with processes in which heating is caused by steam, since the mixing process can be carried out much faster than heating by steam. The larger the required volume of hot milk is, the more time will be saved. Furthermore, the production costs can be reduced as well, since the costly steam generation measures are no longer necessary.

It is, however, also possible to mix the concentrated milk with cold water and to dispense it either as cold milk beverage or to further process it in the coffee machine like the ordinary fresh milk which has hitherto been used.

It is e.g. easily possible to foam the mixture of concentrated milk and hot or cold water as usual and to use it for preparing milk foam.

This is preferably done by active blowing-in of air, the point where such blowing-in is effected being not critical.

It will be expedient when the milk supply is connected to the mixing device via a releasable communication connection so that exchange will be simple and so that it will be possible to use e.g. also commercially available containers (e.g. bag-in-box systems) which are already provided with a sterile connection hose.

The concentrated milk used can be any commercially available milk concentrate, but what is preferably used is concentrated milk which has only had its water content reduced. This can be done by a great variety of methods, e.g. according to the method described in WO-A-2004/028260, or, preferably, by a reverse osmosis method of the type described e.g. in JP-A-8089165. These methods can concentrate milk to a residual volume of 30%; other than in the case of condensed milk, the taste of the milk will not be impaired, i.e., after having been mixed with water, the concentrated milk will taste like fresh milk.

The heating of the milk with the aid of hot water has the additional advantage that the temperature can be adjusted easily in this way and that the temperature of the milk dispensed can be varied.

The presence of hot water in the milk preparation area additionally has the essential advantage that cleaning can be carried out with hot water; in the case of such cleaning, rinsing as well as heating for the purpose of killing harmful microorganisms is carried out easily and at a reasonable price.

BRIEF DESCRIPTION OF THE DRAWING

One embodiment of the present disclosure will be explained in detail hereinbelow making reference to the single drawing, which shows a sectional view of a coffee machine 1 according to the present disclosure in a highly schematic representation.

DETAILED DESCRIPTION OF THE PREFERRED EMBODIMENTS

The coffee machine 1 comprises a housing 2 accommodating the customary components which are necessary or desirable for preparing and dispensing brewed beverages, such as coffee or tea. In order simplify the representation, the FIGURE only shows a container 3 which contains the raw material for brewed beverages, such as coffee beans or coffee grounds; in the embodiment shown, this container 3 is placed on top of the housing 2 and is connected to a brewing unit 5 via a supply duct 4. The brewing unit 5 communicates via a conduit 6 with an outlet 7 which represents part of a discharge means 8 and which is arranged above a surface 9 that can be used for placing thereon a vessel 10 to be filled; the vessel shown here is a cup.

The brewing unit 5 is supplied via a conduit 11 with hot water which is prepared in a hot water maker 12. The hot water maker 12 can e.g. be a boiler or a continuous-flow heater or a hot water maker of some other kind, which is suitable for and used for coffee machines. In the embodiment shown, the hot water maker 12 is connected via a conduit 13 to a cold water supply 50, which can e.g. be the water mains of the building in question.

The coffee machine 1 according to the present disclosure is additionally configured for dispensing milk-containing beverages. These beverages can be mixed beverages containing coffee or tea or they can be dispensed in the form of pure hot or cold milk. The coffee machine 1 according to the present disclosure comprises a milk preparation unit 14 for this purpose. The unit 14 contains a milk supply 15, which can be arranged in the interior of the housing 2 or outside thereof. The milk supply 15 can be a commercially available retail pack, or it can comprise a separate milk container into the which the retail packs are decanted. The milk supply is preferably implemented such that it can accommodate commercially available bag-in-box systems which are already provided with a sterile packaged hose. The milk supply 15 is preferably chilled.

The milk supply 15 communicates via a milk conduit 16 with a mixing device 17. The conduit 16 can be the above-mentioned sterile hose or an installed conduit, which should, how-ever, be adapted to be detached from the mixing device 17 and/or the milk supply 15 for intensive cleaning. In addition, the conduit 16 can have associated therewith a valve, which is not shown, or some other element, e.g. a pump, with which the amount of milk conveyed from the milk supply 15 to the mixing device 17 can be adjusted. If the milk preparation unit 14 is configured for cleaning with hot water, the milk supply 15 should be adapted to be shut off against an accumulation of hot water.

The milk supply 15 contains concentrated milk that is preferably a concentrated milk which had only extracted therefrom most of the water, but in which all the other milk components are essentially still fully contained, and which is still liquid, i.e. capable of flowing. Suitable methods for producing such concentrated milk are described e.g. in WO-A-2004/028260 or in JP-A-8089165, the reverse osmosis method according to the last-mentioned publication being specially preferred.

In the preferred embodiment, the mixing device 17 communicates via a conduit 18 with a hot water maker, which can be the hot water maker 12 that is already provided in the coffee machine for supplying the brewing unit 5. Also the conduit 18 can be provided with a valve, which is not shown, or with some other element by means of which the amount of hot water supplied to the mixing device 17 can be maintained at a predetermined value or changed, if desired.

In the embodiment shown, the mixing device 17 is implemented as a simple T- or Y-connector 19 whose third connection leads with a mixing conduit 20 into the discharge means 8. In the embodiment shown, the conduit 20 has an outlet 21 of its own, which can also be arranged above the surface 9 or which terminates above a separate surface. It is, however, also possible to implement the conduit 20 such that it opens into the outlet 7.

Furthermore, it is also possible to connect a cold water conduit 26 to the mixing device 17 so that the concentrated milk taken from the supply 15 can also be mixed with cold water. The cold water conduit 26 communicates with a cold water source 50; in the present embodiment, the cold water conduit 26 branches from the cold water conduit 13 before the hot water maker 12.

The conduit 20 opens into one of the conventional foaming units 22, e.g. a modified foaming unit according to DE 44 45 436. The foaming unit 22 includes an emulsifying means 23, which, in the embodiment shown, is an emulsifying chamber whose cross-section is enlarged in comparison with the cross-section of the conduit 20, but which can also simply be implemented as an emulsifying section in said conduit 20. For the purpose of foaming, air is either sucked in according to the Venturi principle in the usual way, or it is blown in actively. In the embodiment shown, air is blown in under pressure; for this purpose, a compressed air source 24 in the form of a compressed air reservoir is provided, said compressed air source 24 communicating via a compressed air conduit 25 with the emulsifying means 23.

In addition, the emulsifying means 23 communicates, in the embodiment shown, with a steam generator 27 via a conduit 28. In the embodiment shown, the conduit 20 extending from the mixing device 17, the compressed air conduit 25 and the steam conduit 28 are arranged in a manner corresponding to the mode of arrangement in the case of the foaming unit according to DE 44 45 436. It follows that the embodiment shown in the drawing can also be used for foaming concentrated milk, which has been mixed with cold water, in the usual way, i.e. the steam, which is generated by the steam generator 27 and which flows into the emulsifying chamber through the conduit 28, is used for extracting the milk/water mixture from the mixing device 17, heating it and conducting it into the emulsifying chamber in a finely dispersed condition. This process is additionally intensified by the air used for the purpose of foaming and supplied through the conduit 25 which opens into the conduit 28 at a point upstream of the location where the conduit 20 opens into said conduit 28 and up-stream of the emulsifying chamber.

The steam conduit 28 is, like the other conduits, adapted to be shut off, if the concentrated milk has been mixed with hot water in the mixing device 17 and has thus already been heated and if additional heating, which can, if necessary, be carried out by means of a blast of steam, is not required.

Furthermore, it is also possible to implement the compressed air conduit 25 such that it opens into the conduit 20 directly at or before the emulsifying chamber. According to another possibility, the air required for foaming can be already be added to the hot or cold water in the conduits 18 and 26, respectively, of the mixing device 17 or to the concentrated milk in conduit 16.

If it is desired to dispense a milk-containing beverage, an amount of concentrated milk, which suffices to prepare the desired amount to be dispensed at the desired discharge temperature, is fed from the milk supply 15 into the mixing device 17. Simultaneously, an amount of hot water, which suffice to prepare the desired amount to be dispensed at the desired temperature, is fed from the hot water maker 12 through the conduit 18 into the mixing device 17. In said mixing device 17, the concentrated milk is mixed with the hot water, the temperature is further adjusted, if necessary, by a blast of steam and/or by feeding cold water, and, subsequently, the mixed milk is discharged via the conduit 20 from the outlet 21 either in foamed condition accomplished by admixing air or in a non-foamed condition. The table I following hereinbelow shows calculation examples for the discharge temperature in cases in which hot water is used.

TABLE I

| example | milk concentrate proportion by volume | temp. concentrate ° C. | temp. hot water ° C. | temp. discharge ° C. |
|---|---|---|---|---|
| 1 | 30% | 4 | 97 | 69.1 |
| 2 | 35% | 25 | 98 | 72.5 |
| 3 | 40% | 25 | 98 | 68.8 |

(Assumption: heat capacity similar to that of water)

The desired discharge temperature for hot milk or milk foam lies between 65 and 72° C. The above table shows that these temperatures can be achieved by the present method with the usual concentration stages of chilled or unchilled milk. Example: 1: 30% proportion by volume of milk concentrate having a temperature of 4° C. mixed with 70% proportion by volume of hot water having a temperature of 97° C. result in a discharge temperature of approx. 69° C.

If cold milk is to be dispensed, an amount of concentrated milk corresponding to the amount to be dispensed is again fed from the supply 15 into the mixing device 17, and an amount of cold water which suffices for the desired amount to be dispensed is fed through the conduit 26 into the mixing device 17. In said mixing device 17 the concentrated milk is mixed with the cold water and is then conveyed via the conduit 20 to the outlet 21. The concentrated milk mixed with cold water can either be dispensed in an unfoamed condition, or it is heated and foamed by introducing air, e.g. by blowing in compressed air through the conduit 25, and by introducing steam through the conduit 28, in a manner that corresponds to the heating and foaming which can and which actually is performed in the case of non-concentrated fresh milk.

A particular advantage is to be seen in the fact that the milk preparation unit 14 of the coffee machine 1 according to the present disclosure can be rinsed with hot water, since in said coffee machine according to the present disclosure all the milk-conducting conduits and units, and in particular also the foaming unit 22, are connected to the hot water maker 12. Rinsing with hot water will cause an effective mechanical washing out of milk residues, the removal of fatty components or a thermal treatment for reducing bacterial loads which may perhaps exist. As for the rest, cleaning can be carried out as usual; for example, rinsing with cold water can first be carried out so as to remove residues. Other cleaning processes with cleaning agents/cold water/steam/hot water can be performed in an arbitrary sequence.

The disclosure is not limited to the embodiment which has been described and which is shown in the drawing. The coffee machine may e.g. be configured for only mixing the concentrated milk with cold water or for only mixing it with hot water. In addition, a separate hot water maker can be provided for the milk preparation unit. The mixing device used can be any mixing device having a suitable structural design.

The invention claimed is:

1. A coffee machine for preparing hot, milk-containing drinks, comprising a brewing unit, a hot water maker for supplying the brewing unit, a milk supply, for receiving concentrated liquid milk, and a mixing device connected via a milk pipe to the milk supply and via a hot water pipe to the hot water maker, and having a discharge device and a foaming unit including an emulsifying means provided for preparing milk foam by introduction of air
    wherein the coffee machine comprises a cold water source for supplying the hot-water maker,
    wherein a cold water conduit branches from a cold water conduit of the cold water source before the hot water maker,
    wherein the mixing device is connected to the cold water source via the cold water conduit, which branches from the cold water conduit of the cold water source, for mixing the concentrated milk with cold water,
    wherein the emulsifying means prepares milk foam by introduction of air for liquid milk after mixing the concentrated milk with the hot water or the cold water by the mixing device, and
    wherein the coffee machine is configured to discharge the prepared hot, milk-containing drink into an awaiting cup.

2. The coffee machine according to claim 1, and a steam unit for heating the mixture of concentrated milk and cold water with steam.

3. The coffee machine according to claim 1, the emulsifying means being arranged between the mixing device and the discharge device.

4. The coffee machine according to claim 3, wherein the foaming unit includes one of means for blowing air under pressure into a milk/water mixture provided by the mixing device, means for blowing air under pressure into the water, means for blowing air under pressure into the concentrated milk, and means for blowing air under pressure into steam, or a combination thereof.

5. The coffee machine according to claim 1, wherein the mixing device comprises a releasable communication connection to the milk supply.

6. The coffee machine according to claim 1, wherein the mixing device comprises one of a T- or Y-connector which is connected to one of the milk supply, a hot water maker or a cold water source, and to the discharge device.

7. The coffee machine according to claim 1, wherein the concentrated milk is liquid milk whose water content has been reduced.

8. The coffee machine according to claim 7, wherein the water content has been reduced by reverse osmosis.

* * * * *